US012174967B2

(12) United States Patent
Yamamoto et al.

(10) Patent No.: US 12,174,967 B2
(45) Date of Patent: Dec. 24, 2024

(54) SUPPORT DEVICE, SUPPORT METHOD, PROGRAM, AND SUPPORT SYSTEM

(71) Applicant: NIPPON TELEGRAPH AND TELEPHONE CORPORATION, Tokyo (JP)

(72) Inventors: Hideaki Yamamoto, Musashino (JP); Kaku Takeuchi, Musashino (JP); Takahiko Yoshida, Musashino (JP); Fumihiko Magata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 300 days.

(21) Appl. No.: 17/596,760

(22) PCT Filed: Jun. 24, 2019

(86) PCT No.: PCT/JP2019/024985
§ 371 (c)(1),
(2) Date: Dec. 17, 2021

(87) PCT Pub. No.: WO2020/261338
PCT Pub. Date: Dec. 30, 2020

(65) Prior Publication Data
US 2022/0318398 A1    Oct. 6, 2022

(51) Int. Cl.
*G06F 21/57*    (2013.01)
*G06F 21/55*    (2013.01)
(52) U.S. Cl.
CPC .......... *G06F 21/577* (2013.01); *G06F 21/552* (2013.01)

(58) Field of Classification Search
CPC ............................. G06F 21/577; G06F 21/552
See application file for complete search history.

(56) References Cited

U.S. PATENT DOCUMENTS

2015/0212988 A1* 7/2015 Ogawa ............... G06F 16/9577
715/234
2016/0196516 A1* 7/2016 Anisingaraju ..... G06Q 10/0635
705/7.28

FOREIGN PATENT DOCUMENTS

JP    2008033887 A  *  2/2008
JP    2010287009 A  * 12/2010
(Continued)

OTHER PUBLICATIONS

Requirements definition document—Development of common infrastructure for security functions in control systems—, Mar. 2001, Information Processing Promotion Business Association.
(Continued)

*Primary Examiner* — Roderick Tolentino
*Assistant Examiner* — Paul J Skwierawski
(74) *Attorney, Agent, or Firm* — XSENSUS LLP

(57) ABSTRACT

An assistance device (1) includes: a first storage unit (14) storing therein characteristic words related to risks; a second storage unit (16) storing therein pieces of risk countermeasure information related to risk countermeasures; an extraction unit (13) that extracts a word from an input character string, searches in the first storage unit for a characteristic word that is same as or similar to the word, and extracts one of the pieces of risk countermeasure information corresponding to the characteristic word from the second storage unit; and a presentation unit (18) that presents the extracted piece of risk countermeasure information.

16 Claims, 17 Drawing Sheets

(56) References Cited

FOREIGN PATENT DOCUMENTS

| JP | 2013186478 A | | 9/2013 |
|---|---|---|---|
| JP | 2016066012 A | * | 4/2016 |
| JP | 2017204219 A | * | 11/2017 |

OTHER PUBLICATIONS

Sep. 24, 2019, International Search Report issued in the International Patent Application No. PCT/JP2019/024985.
www.aquair.co.jp, Retrieved on 2021, from URL: http://www.aquair.co.jp/download/.
www.jojo-shien.com, Retrieved on Jan. 4, 2013, from URL: http://www.jojo-shien.com/j-sox/616.

* cited by examiner

FIG. 3

| CONSTITUENT ELEMENT ID | NAME OF CONSTITUENT ELEMENT |
|---|---|
| 9100000000000000000000000000000000000000000000000000000000000001 | INTERNET |
| ... | ... |
| 9300000000000000000000000000000000000000000000000000000000000001 | ROUTER |
| 9400000000000000000000000000000000000000000000000000000000000001 | LAN CABLE |
| 9500000000000000000000000000000000000000000000000000000000000001 | PC |
| 9500000000000000000000000000000000000000000000000000000000000002 | PERSONAL COMPUTER |
| 9600000000000000000000000000000000000000000000000000000000000001 | WIRELESS COMMUNICATION SECTION |
| 9700000000000000000000000000000000000000000000000000000000000001 | SVR |
| 9700000000000000000000000000000000000000000000000000000000000002 | SERVER |
| ... | ... |
| 9800000000000000000000000000000000000000000000000000000000000001 | SWITCH |
| 9800000000000000000000000000000000000000000000000000000000000002 | L 2 SW |
| 9900000000000000000000000000000000000000000000000000000000000001 | LOG DATA |

| FLAG | | | PREDICATE ID | PREDICATE EXPRESSION |
|---|---|---|---|---|
| MEANING OF "STATE" | MEANING OF "CHANGE" | MEANING OF "UNDESIRABLE CONSEQUENCE" | | |
| 1 | 0 | 0 | 1200000000000000000000000000000001 | HAVE NO REQUIREMENT WRITTEN |
| ... | ... | ... | ... | ... |
| 1 | 0 | 0 | 1300000000000000000000000000000001 | HAVE OS SUPPORT EXPIRED |
| ... | ... | ... | ... | ... |
| 1 | 0 | 0 | 1400000000000000000000000000000001 | COMMUNICATED IN CLEARTEXT |
| 1 | 0 | 0 | 1400000000000000000000000000000002 | NOT ENCRYPTED |
| ... | ... | ... | ... | ... |
| 0 | 1 | 0 | 1500000000000000000000000000000001 | TRANSMIT |
| 0 | 1 | 0 | 1500000000000000000000000000000002 | TRANSFER |
| 0 | 1 | 0 | 1600000000000000000000000000000002 | IS DELETED |
| 0 | 0 | 1 | 1700000000000000000000000000000001 | STOP OPERATING |
| 0 | 0 | 1 | 1700000000000000000000000000000002 | DISCONTINUE |
| ... | ... | ... | ... | ... |
| 0 | 0 | 1 | 1800000000000000000000000000000001 | LEAK |
| 0 | 0 | 1 | 1800000000000000000000000000000002 | HAVE A LEAK |

| CONSTITUENT ELEMENT | CLASSIFICATION | EVENT | EVENT DETAILS |
|---|---|---|---|
| SVR | COMMON | CONTENT TAMPERING | WEBPAGE TAMPERING, ETC. |
| | | | DRIVE-BY DOWNLOAD ATTACK (TRANSFER SCRIPT IS EMBEDDED) |
| | | | WATERING HOLE ATTACK (TRANSFER SCRIPT IS EMBEDDED) |
| | | | SPOOFING ADMINISTRATOR IDENTITY TO TARGET VULNERABILITY OF CMS, ETC. |
| | | | LOG TAMPERING |
| | | ATTACK ON VULNERABILITY OF OS | PING OF DEATH ATTACK (ICMP) |
| | | | Shellshock |
| | | ATTACK ON VULNERABILITY THAT ALLOWS CODE EXECUTION | Buffer Over Flow |
| | | ATTACK ON VULNERABILITY OF AUTHENTICATION PROTOCOL | REPLAY ATTACK |
| | | | BYPASSING UNNECESSARY AUTHENTICATION |
| | | ATTACK ON DEFECTS IN ACCOUNT MANAGEMENT | ABUSING UNNECESSARY FORGOTTEN ACCOUNT |
| | | | ABUSING DEFAULT ID/PW |
| | | STEALING AUTHENTICATION INFORMATION SUCH AS PASSWORD | PASSWORD LIST ATTACK |
| | | | BRUTE-FORCE ATTACK |
| | | | REVERSE BRUTE-FORCE ATTACK |
| | | | DICTIONARY ATTACK |
| | | | (PASSWORD) GUESSING ATTACK |
| | | ATTACK ON VULNERABLE ENCRYPTION | FAKING SVR CERTIFICATE |
| | | | ATTACK ON IMPORTANT INFORMATION SAVED WITH VULNERABLE ENCRYPTION |
| | | ENCRYPTION CRACKING ATTACK | SELECTED PLAINTEXT ATTACK |
| | | ENCRYPTION CRACKING ATTACK ON SSL | POODLE ATTACK |
| | | | VERSION ROLLBACK ATTACK |
| | | | Heartbleed |
| | | CONTENT TAMPERING USING MALICIOUS PROGRAM | RANSOMWARE |
| | | ILLEGITIMATE USE OF RESOURCES BY MALICIOUS PROGRAM | SPAM EMAIL |
| | | | MINING VIRTUAL CURRENCY |
| | | | CRACKING ENCRYPTION |
| | | INFECTION FROM MALICIOUS PROGRAM | TROJAN HORSE |
| | | | WORM (VIA FILE/EMAIL/IP NETWORK) |
| | | REMOTE COMMAND EXECUTION THROUGH BACKDOOR | RAT |
| | | | VULNERABILITY OF OS-STANDARD REMOTE ACCESS FUNCTION |
| | | MAKING ATTACK PLATFORM A CONSTITUENT ELEMENT | BOTNET ATTACK |
| | | ILLEGITIMATE LOGIN USING ILLEGITIMATELY ACQUIRED AUTHENTICATION INFORMATION | ABUSING STOLEN ID/PW |
| | | DoS ATTACK | DoS ATTACK ON VULNERABILITY OF OS OR MIDDLEWARE |
| | | | SYSTEM DESTRUCTION (SYSTEM ERASURE) USING MALWARE OR COMMAND |
| | | OTHERS (COLLECTING INFORMATION FOR ATTACK, ETC.) | PORT SCAN |
| | | | VERSION SCAN |

FIG. 5B

| | | |
|---|---|---|
| DNS SYSTEM | ATTACK ON DNS (CACHE) | DNS Cache Poisoning (KAMINSKY ATTACK) |
| | DEFECTS IN SETTINGS OF DNS | OPEN RESOLVER |
| | | DNS WATER TORTURE ATTACK |
| WEB SYSTEM F2 | ATTACK ON VULNERABILITY DUE TO DEFECTS IN DESCRIPTION OF WEB CONTENT | CSRF |
| | | XSS |
| | | CRLF Injection |
| | | HTTP Header Injection |
| | | SQL Injection |
| | | OS Command Injection |
| | | CLICKJACKING ATTACK |
| | | ERASING CONTENT (RESULTING IN DoS) |
| | | ERASING DB |
| | ATTACK ON VULNERABILITY OF WEB SESSION | SESSION HIJACK |
| | | SESSION ADOPTION |
| | | SESSION FIXATION |
| | MALICIOUS PROGRAM DISTRIBUTION ATTACK USING WEB CONTENT | WORM |
| | | BOT |
| | | DRIVE-BY DOWNLOAD ATTACK |
| | | Directory Traversal |
| | VULNERABILITY OF WEB SYSTEM (OTHERS) | OBTAINING IMPORTANT INFORMATION SAVED IN PUBLIC REGION (INCLUDING UNINTENTIONAL PUBLICATION DUE TO MISTAKE IN PUBLICATION SETTINGS, ETC.) |
| | | MALICIOUS CONTENT PROVIDED BY LEGITIMATE USER (EXAMPLES: FAKE NEWS, HATE SPEECH, CHILD PORNOGRAPHY, COPYRIGHT VIOLATION) |
| | ABUSING WEB SERVICE | |
| | DoS ATTACK | SLOW DoS ATTACK |
| | | F5 DoS ATTACK |
| | PATH INFORMATION TAMPERING | CONTENT DESTRUCTION BY MALWARE OR COMMAND |
| | | ARP Poisoning (ARP Spoofing) |
| | | BGP HIJACK |
| | EAVESDROPPING | Sniffing |
| | PACKET SPOOFING | DISCONNECTING TCP SESSION (PACKET SPOOFING) |
| | | REPLAY ATTACK |
| | | (SPOOFING COMMUNICATION SEQUENCE, HIJACKING SESSION) |
| | | SMURF ATTACK |
| | DoS ATTACK | REFLECTION DDoS ATTACK |
| | | SYN FLOOD ATTACK |
| | | ICMP FLOOD ATTACK |
| | | UDP FLOOD ATTACK |
| | | PORT SCAN |
| | OTHERS (COLLECTING INFORMATION FOR ATTACK, ETC.) | TARGETED ATTACK EMAIL, ETC. |
| OPERATING ORGANIZATION | ATTACK ON OPERATOR | |
| | SPOOFING OPERATOR IDENTITY | |
| | OPERATION MISTAKE | INFORMATION LEAKAGE DUE TO DEFECTS IN RULE SETTINGS FOR DISCARD, ETC. |

FIG. 6

| FLAG | | INVOLVED PARTY ID | NAME OF INVOLVED PARTY |
|---|---|---|---|
| ATTACKER | VICTIM | | |
| 1 | 0 | 6980000000000000000000000000000000000001 | MALICIOUS THIRD PARTY |
| 0 | 1 | 6380000000000000000000000000000000000001 | ADMINISTRATOR |
| 0 | 1 | 6020000000000000000000000000000000000001 | SYSTEM DEVELOPER IN COMPANY A |
| ... | ... | ... | ... |
| 0 | 1 | 6980000000000000000000000000000000000001 | DENDEN TARO |
| 0 | 1 | 6980000000000000000000000000000000000002 | DEN-DEN TARO |
| ... | ... | ... | ... |
| 0 | 1 | 6150000000000000000000000000000000000001 | END USER P |
| 0 | 1 | 6690000000000000000000000000000000000001 | END USER Q |

14c

FIG. 7A
| RISK ITEM NUMBER | CONSTIT- UENT ELEMENT | RISK SOURCE | MALWARE COUNTERMEASURES AT SVR IS INSUFFICIENT |
|---|---|---|---|
| 001 | SVR | EVENT | SVR ATTACKS PC AND ERASES CLIENT DATA FILES |
|  |  | CONSEQUENCE | CLIENT INFORMATION IN PC IS LOST |
FIG. 7B
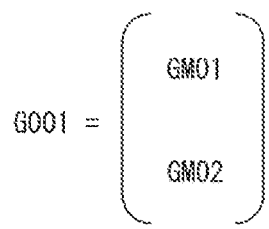
FIG. 7C
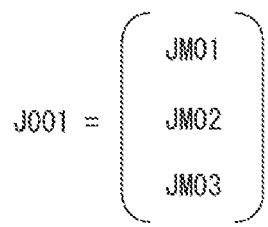
FIG. 7D
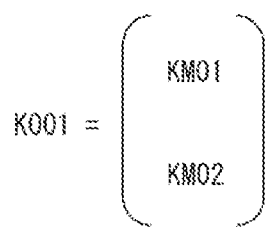

FIG. 8A

| SUBJECT (WHO) | SPECIFIC ACTION (DO) | WHERE (NAME OF CONSTITUENT ELEMENT) |
|---|---|---|
| CORPORATE SYSTEM ADMINISTRATOR | BLOCK DELETE COMMANDS FROM REMOTE LOCATION | IN PC |

FIG. 8B $$T001 = \begin{pmatrix} TM01 \\ TM02 \\ TM03 \end{pmatrix}$$

| RISK ITEM NUMBER | METADATA VALUE OF CONSTITUENT ELEMENT | G (METADATA VALUE OF CONSTITUENT ELEMENT) | G (METADATA VALUE OF STATE) | J (METADATA VALUE OF ATTACKER) | J (METADATA VALUE OF CHANGE) | J (METADATA VALUE OF CONSTITUENT ELEMENT) | ... |
|---|---|---|---|---|---|---|---|
| 001 | 9600000000000 00000000000 00000000000 000001 | GM01 | GM02 | JM01 | JM02 | JM03 | |
| 002 | ... | ... | ... | ... | ... | | |
| ... | | | | | | | |

| K (METADATA VALUE OF VICTIM) | K (METADATA VALUE OF UNDESIRABLE CONSEQUENCE) | T (METADATA VALUE OF SUBJECT) | T (METADATA VALUE OF SPECIFIC ACTION) | T (METADATA VALUE OF CONSTITUENT ELEMENT) |
|---|---|---|---|---|
| KM01 | KM02 | TM01 | TM02 | TM03 |
| ... | ... | ... | ... | ... |

SUPPORT DEVICE, SUPPORT METHOD, PROGRAM, AND SUPPORT SYSTEM

TECHNICAL FIELD

The present invention is related to an assistance device, an assistance method, a program, and an assistance system.

BACKGROUND ART

Conventionally, at the time of creating a requirement definition document, a method is widely used by which a risk countermeasure extracted from a Risk Control Matrix (hereinafter, "RCM") (a table keeping relationships organized between "anticipated risks" and "measures to be taken to address the risks") is read and written into the requirement definition document (see Non-Patent Literature 1 and Non-Patent Literature 2). According to this method, it is often the case that, because of the structure of the RCM, a risk assessment focusing on individual constituent elements tends to serve as a main object. For this reason, a person who creates the requirement definitions (hereinafter, "requirement definition creator") tends to feel that it is sufficient to simply apply the risk countermeasure to the corresponding constituent element.

Besides, there may be some situations where it is impossible to apply a countermeasure to the "constituent element subject to a risk analysis" due to restrictions related to development costs, a completion schedule, or the like of a designed project. In those situations, the requirement definition creator may settle for the second best solution, which is to apply a risk countermeasure to a different constituent element. For example, when it is impossible to apply an anti-malware countermeasure to a server, the requirement definition creator may settle for simply making the policy settings of a firewall (FW) stricter.

CITATION LIST

Non-Patent Literature

Non-Patent Literature 1: Azone Partners Inc., "RCM (Risk Control Matrix) no Sakusei Houhou" ("How to Create an RCM (Risk Control Matrix)" in Japanese), [online], Jan. 4, 2013 [retrieved on Jun. 12, 2019], from the Internet (URL: http://www.jojo-shien.com/j-sox/616)

Non-Patent Literature 2: Aquair Consulting "J-SOX Taiou IT Tousei RCM (Risk Control Matrix) Download" ("J-SOX-compatible IT-Control RCM (Risk Control Matrix) Download" in Japanese), [online], [retrieved on Jun. 12, 2019], from the Internet (URL: http://www.aquair.co.jp/download/)

Non-Patent Literature 3: Information-technology Promotion Agency, Japan, "Youken Teigisho: Seigyokei Ni Okeru Security Kinou Kyoutsuu Kiban No Kaihatsu" ("Requirement Definition Document: Development of Platform for Common Use Among Security Functions in Control Systems" in Japanese), March 2001, [retrieved on Jun. 12, 2019], from the Internet (URL: https://www.ipa.go.jp/files/000013611.pdf)

SUMMARY OF THE INVENTION

Technical Problem

At the time of creating a requirement definition document as described above, the "constituent element subject to a risk analysis" may be different from the "constituent element to which a relevant risk countermeasure is applied". In that situation, the requirement definition staff may fail to pay attention to the constituent elements other than the former and may, as a result, create a requirement definition document containing insufficient security countermeasures. Further, as another approach for preparing a requirement definition document, a method is known by which "undesirable occurrences from the viewpoint of confidentiality, integrity, and availability" are expressed clearly at first, so as to write descriptions by breaking down these points. However, in many situations, the configuration of a system to be developed is not sufficiently firm in an upstream process, and the work is performed while there are uneasy feelings about what countermeasure should be applied to which constituent element and what sentences should be used for the descriptions thereof. This can be an obstruction for improvement of the quality of the work.

In view of the circumstances described above, it is an object of the present invention to provide an assistance device, an assistance method, a program, and an assistance system capable of shortening the time required by risk assessment work, while minimizing potentially missing security requirements.

Means for Solving the Problem

To solve the abovementioned problem, an assistance device according to the present embodiments includes:
a first storage unit storing therein characteristic words related to risks;
a second storage unit storing therein pieces of risk countermeasure information related to risk countermeasures;
an extraction unit that extracts a word from an input character string, searches in the first storage unit for a characteristic word that is same as or similar to the word, and extracts one of the pieces of risk countermeasure information corresponding to the characteristic word from the second storage unit; and
a presentation unit that presents the extracted piece of risk countermeasure information.

To solve the abovementioned problem, an assistance method according to the present embodiments includes:
a step performed by a first storage unit to store therein characteristic words related to risks;
a step performed by a second storage unit to store therein pieces of risk countermeasure information related to risk countermeasures;
a step performed by an extraction unit to extract a word from an input character string, to search in the first storage unit for a characteristic word that is same as or similar to the word, and to extract one of the pieces of risk countermeasure information corresponding to the characteristic word from the second storage unit; and
a step performed by a presentation unit to present the extracted piece of risk countermeasure information.

To solve the abovementioned problem, a program according to the present embodiments causes a computer to function as the abovementioned assistance device.

To solve the abovementioned problem, an assistance system according to the present embodiments includes an assistance device, a first terminal communicably connected to the assistance device, and a second terminal communicably connected to the assistance device, and
the assistance device includes:
a first storage unit storing therein characteristic words related to risks;

a second storage unit storing therein pieces of risk countermeasure information related to risk countermeasures;

an extraction unit that extracts a word from a character string input to the first terminal, searches in the first storage unit for a characteristic word that is same as or similar to the word, and extracts one of the pieces of risk countermeasure information corresponding to the characteristic word from the second storage unit; and a presentation unit that presents the extracted piece of risk countermeasure information on the second terminal.

Effects of the Invention

By using the assistance device, the assistance method, the program, and the assistance system according to the present invention, it is possible to shorten the time required by the risk assessment work, while minimizing potentially missing security requirements.

BRIEF DESCRIPTION OF DRAWINGS

FIG. 3 is a drawing showing a structure of a constituent element DB.

FIG. 4 is a drawing showing a structure of a predicate DB.

FIG. 5A is a first drawing showing specifics related to changes.

FIG. 5B is a second drawing showing specifics related to changes.

FIG. 6 is a drawing showing a structure of an involved party DB.

FIG. 7A is a drawing showing risk descriptions in an RCM.

FIG. 7B is a drawing showing a first matrix.

FIG. 7C is a drawing showing a second matrix.

FIG. 7D is a drawing showing a third matrix.

FIG. 8A is a drawing showing a risk countermeasure in an RCM.

FIG. 8B is a drawing showing a fourth matrix.

FIG. 9 is a diagram showing a structure of a second storage unit.

DESCRIPTION OF EMBODIMENTS

Figure 1:
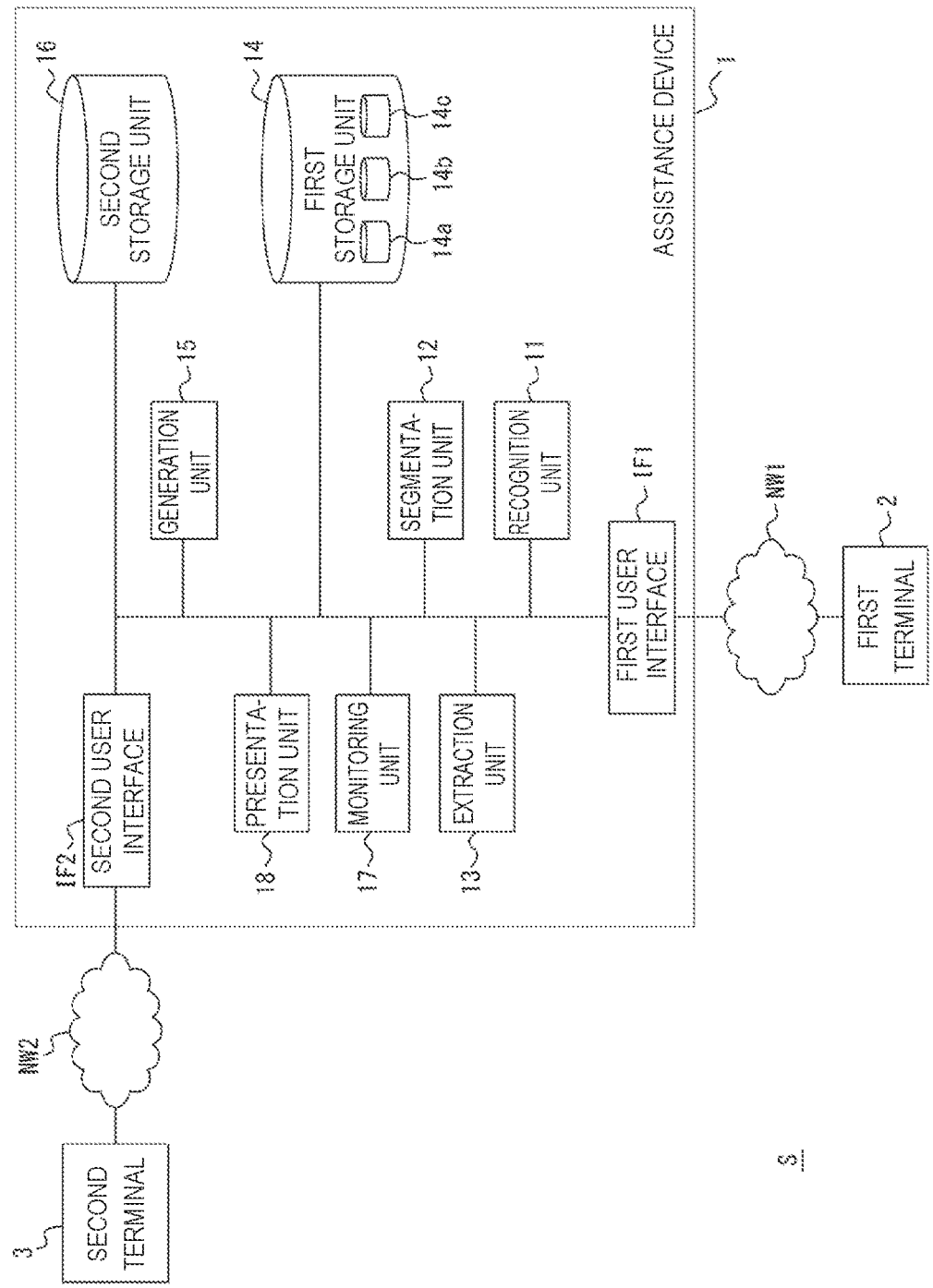
FIG. 1 is a functional block diagram of an assistance system of the present embodiments.

As shown in FIG. 1, an assistance system S of an embodiment described herein includes an assistance device 1, a first terminal 2, a second terminal 3, a first network NW1, and a second network NW2. The assistance device 1 is communicably connected to the first terminal 2 via the first network NW1. The assistance device 1 is communicably connected to the second terminal 3 via the second network NW2.

With reference to FIG. 1, a functional block diagram of the assistance device 1 will be explained in detail. Although various functions of an assistance method implemented by the assistance device 1 will be explained in detail, other functions are not meant to be excluded.

The assistance device 1 includes a first user interface IF1, a second user interface IF2, a recognition unit 11, a segmentation unit 12, an extraction unit 13, a first storage unit 14, a generation unit 15, a second storage unit 16, a monitoring unit 17, and a presentation unit 18.

The first user interface IF1 and the second user interface IF2 are each an interface that receives an input from a user. The first user interface IF1 and the second user interface IF2 of the present embodiment each receives an input from a user via the first network NW1 and via the second network NW2, respectively. In an alternative example, however, the first user interface IF1 and the second user interface IF2 may directly receive the inputs from the users without the mediations of the networks.

The processes (explained later) performed by the recognition unit 11, the segmentation unit 12, the extraction unit 13, the generation unit 15, the monitoring unit 17, and the presentation unit 18 are executed by one or more processors. The processors may each be a generic processor or a dedicated processor specializing in a particular process.

The first storage unit 14 and the second storage unit 16 may each be realized with one or more memories. Each of the one or more memories may be, for example, a semiconductor memory, a magnetic memory, an optical memory, or the like, but is not limited to these examples. Each of the one or more memories may function as, for example, a main storage device, an auxiliary storage device, or a cache memory. Each of the one or more memories may store therein information about a result of an analysis or a process performed by the assistance device 1. Each of the one or more memories may store therein, among others, various types of information related to operations and control performed by the assistance device 1.

The first terminal 2 of the present embodiment is an arbitrary terminal used by an operator who performs formalization work on a Risk Control Matrix (RCM).

The RCM denotes a table keeping relationships in correspondence with each other between anticipated risks (e.g., a risk of having a false statement written in a financial report) and control activities (control) exercised to reduce the risks thereof. For example, the term "risk" may be defined as below along the international standards (ISO 31000) or the Japanese Industrial Standards (JIS Q 31000) related to risk management.

Risk: the effect on uncertainty on objectives

The RCM is primarily used at the time of evaluating maintenance or evaluating operations of application control. A risk assessment using the RCM has advantages, among others, where it is possible to objectively understand on which anticipated risk a risk countermeasure is based and where it is possible to select and dismiss countermeasure proposals, because control methods are classified with regard to the plurality of countermeasure proposals.

As mentioned above, the RCM is originally used for the purpose of making clear the risks anticipated in work and control activities corresponding to the risks. However, in the present embodiment, the RCM is adaptively used for a security risk assessment of an information system. In the present embodiment, the RCM is used for a risk assessment of the information system. In an alternative example, however, the RCM may be applied to a risk assessment related to "flows" in an entity such as a goods distribution system, a financial system, or a power generation, transmission, distribution, and transformation system. In these application examples, by analyzing risks of elements constituting the flows while focusing on the flows of the goods, money, or electric power, it is possible to determine how to reduce risks, such as what countermeasure should be applied to which constituent element in what phase.

Returning to the description of the present embodiment, upon receipt of an input from the operator, the first terminal 2 transmits the content of the input to the assistance device 1 via the first network NW1.

The second terminal 3 of the present embodiment is an arbitrary terminal used by an operator who creates a request definition document. Upon receipt of an input from the operator, the second terminal 3 transmits the content of the input to the assistance device 1 via the second network NW2.

The second terminal 3 is capable of receiving the content of an output from the assistance device 1 via the second network NW2 and causing a display unit of the second terminal 3 to display the received information. For example, the display unit may be a liquid crystal display device, an organic EL display device, or an inorganic EL display device.

[The First Phase: Formalization of Sentences in the RCM]

Figure 2:
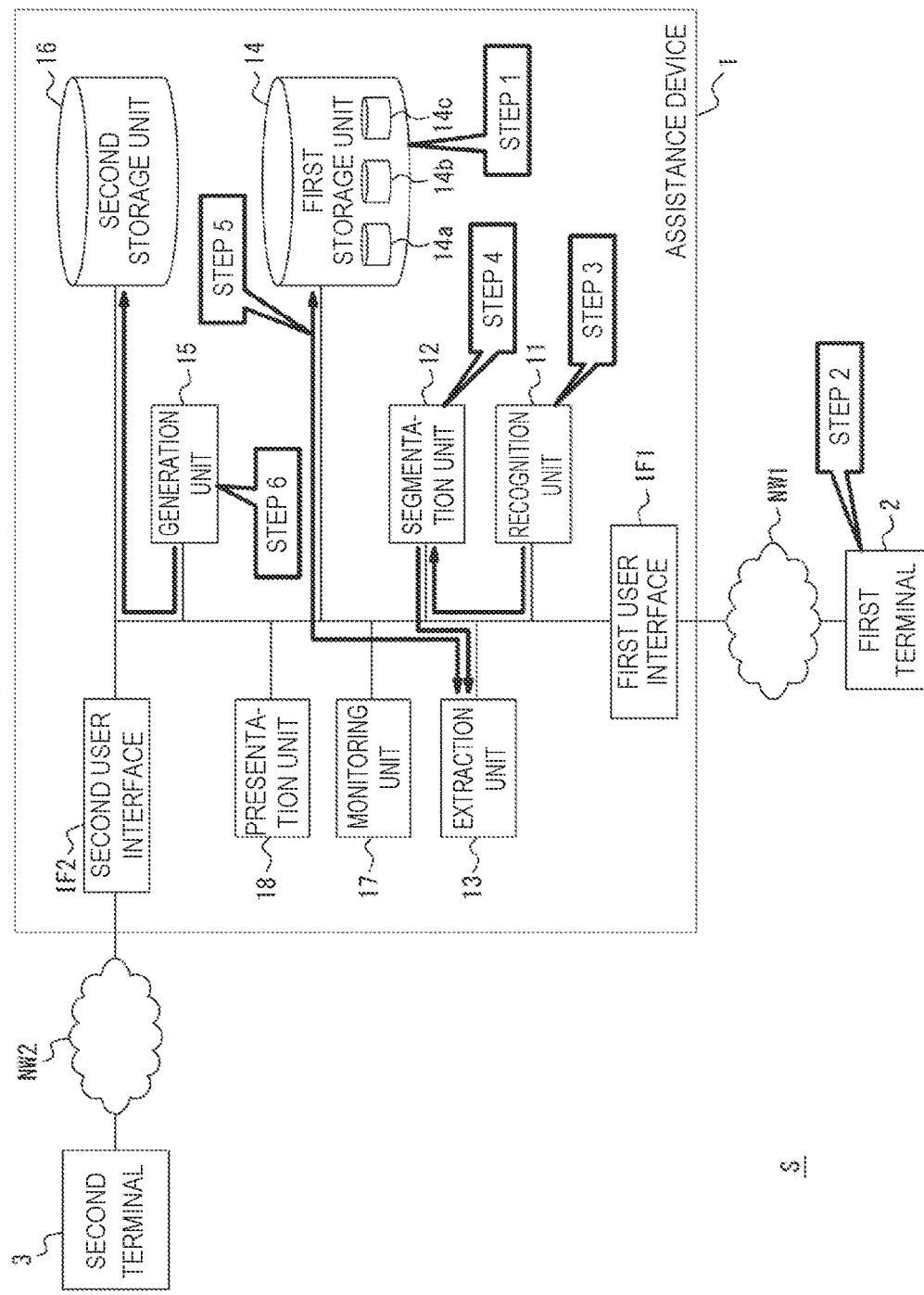
FIG. 2 is a diagram showing an outline of a formalization process performed by the assistance system.

An outline of the formalization process performed by the assistance system S will be explained with reference to FIG. 2.

At step 1 shown in FIG. 2, for example, an administrator or the like of the assistance system S focuses on characteristics of words that frequently appear in the character strings under the sections of "Risk Source", "Event", "Consequence", and "Countermeasure" in the RCM at an arbitrary point in time and inputs the words expressing the characteristics (hereinafter, "characteristics words") to the first storage unit 14. The terms "risk source", "event", and "consequence" may be defined as below, for example, along the international standards (ISO 31000) or the Japanese Industrial Standards (JIS Q 31000) related to risk management.

Risk source: An element having the intrinsic potential to give rise to risk, either by itself or in combination with others Event: Occurrence or a change in a certain series of circumstances Consequence: the outcome of an event having an effect on objectives As defined above, the characteristic words are words related to risks. For example, under the "Risk Source" in the RCM, the meaning of a "state" such as "having OS support expired" or "having no patch applied" corresponds to the characteristics. As explained later, the administrator or the like of the assistance system S structures a constituent element DB 14a, a predicate DB 14b, and an involved party DB 14c in accordance with the characteristics of the characteristic words and further assigns metadata to the characteristic words.

At step 2, upon receipt of a user instruction, for example, the first terminal 2 transmits the RCM to the assistance device 1 via the first network NW1.

At step 3, the recognition unit 11 of the assistance device 1 reads the RCM.

At step 4, the segmentation unit 12 structures the character strings in the RCM into, for example, involved parties, constituent elements, and predicates.

At step 5, the extraction unit 13 conducts a search to see whether or not the words structured at step 4 are present among the characteristic words in the first storage unit 14. When one or more characteristic words are present in the first storage unit 14, the extraction unit 13 extracts the metadata corresponding to the characteristic words from the first storage unit 14.

At step 6, the generation unit 15 stores, into the second storage unit 16, the pieces of metadata of a risk source, an event, a consequence, and a countermeasure so as to be kept in correspondence with one another.

Next, a process performed by the assistance system S in the first phase will be explained in detail.

The first storage unit 14 includes the constituent element DB 14a. As shown in FIG. 3, the constituent element DB 14a structures and stores therein constituent element IDs and names of constituent elements so as to be kept in correspondence with each other. The constituent element IDs are metadata and may be 50-digit numerical values, for example. The names constitute a list of the constituent elements. Similar names may have assigned thereto constituent element IDs of almost equal values. Having almost equal values may denote the state in which the Hamming distance between the pieces of metadata is minimized. For example, the constituent element IDs of the names "PC" and "Personal Computer" are different in only the last digit.

The first storage unit 14 includes a predicate DB 14b. As shown in FIG. 4, the predicate DB 14b structures and stores therein flags, predicate IDs, and predicate expressions so as to be kept in correspondence with one another. The flags and the predicate IDs are metadata. The predicate IDs may be 50-digit numerical values, for example. The predicate expressions constitute a list of the predicates. The flag indicates which one of the following meanings is expressed by each predicate: "state" (i.e., an undesirable state from the viewpoint of information security); "change" (i.e., a change in the constituent element); and "undesirable consequence" (i.e., an undesirable consequence from the viewpoint of information security). Similar predicate expressions may have assigned thereto predicate IDs of almost equal values. For example, the predicate IDs of the predicate expressions "Communicated in Cleartext" and "Not Encrypted" are different in only the last digit.

The character strings written under the section of "Risk Source" in the RCM correspond to the situations where one of the words expressing the meaning of a "state" in the predicate DB 14b is the predicate. The character strings written under the section of "Event" in the RCM correspond to the situations where one of the words expressing the meaning of a "change" is the predicate. The character strings written under the section of "Consequence" in the RCM correspond to the situations where one of the words expressing the meaning of an "undesirable consequence from the viewpoint of confidentiality, availability, and integrity" is the predicate.

The events enclosed in the bold frame F1 of FIG. 5A and in the bold frame F2 of FIG. 5B are lists of illustrative examples of specifics related to the "Changes" being input under the section of "Predicate Expression" in the predicate DB 14b. For example, the noun phrase "content tampering" in FIG. 5A may be written as "content is tampered" under the section of "Predicate Expression". To this writing, a flag corresponding to the meaning of a "change" is applied in the predicate DB 14b. As another example, the noun phrase "attack on vulnerability of OS" may be written as "(is) attacked on vulnerability of OS" under the section of "Predicate Expression".

The first storage unit 14 includes the involved party DB 14c. As shown in FIG. 6, the involved party DB 14c structures and stores therein flags, involved party IDs, and names of involved parties so as to be kept in correspondence with one another. The involved parties may include persons or organizations involved in a prescribed information system. The flags and the involved party IDs are metadata. The involved party IDs may be, for example, 50-digit numerical values. The names of the involved parties constitute a list of the involved parties.

Each of the flags indicates either an "attacker" or a "victim" in accordance with the characteristics of the involved party. In some situations, an involved party may be both an attacker and a victim. For this reason, in an alternative example, a flag may indicate both an "attacker" and a "victim".

To take spelling variants of certain involved parties into account, it is acceptable to assign involved party IDs having almost equal values to any single involved party. For example, as shown in FIG. 6, the involved party IDs of "Denden Taro" and "Den-den Taro" are different in only the last digit.

A process of storing risk analysis information into the second storage unit 16 will be explained in detail, with reference to FIG. 7A.

When the recognition unit 11 has read the section of "Constituent Element" from the RCM, the extraction unit 13 searches in the constituent element DB 14a and identifies one or more words that are the same as or similar to the read constituent elements. As for the method for identifying the similar words, it is possible to adopt the methods described in the following documents:

Japanese Patent No. 5094486 (SYNONYMITY DETERMINATION DEVICE, METHOD THEREFOR, PROGRAM, AND RECORDING MEDIUM)

Japanese Patent No. 6368633 (TERM MEANING LEARNING DEVICE, TERM MEANING DETERMINATION DEVICE, METHOD, AND PROGRAM)

Japanese Patent No. 6495124 (TERM MEANING CODE DETERMINATION DEVICE, TERM MEANING CODE DETERMINATION MODEL LEARNING DEVICE, METHOD, AND PROGRAM).

The extraction unit 13 may identify only the most similar word from among the similar words. The extraction unit 13 holds metadata GM01 corresponding to the identified information.

When the recognition unit 11 has read the section of "Risk Source" from the RCM, the segmentation unit 12 analyzes the read information and extracts words corresponding to the predicates. As for the analysis method, it is possible to adopt text mining, for example. In other words, the segmentation unit 12 may extract the words corresponding to the predicates by performing the following two processes:

1. Morpheme Analysis

To segment a sentence into the smallest meaningful language units (morphemes) so as to assign grammatical nature thereof (the part of speech or the like)

2. Parsing

To group the morphemes extracted in the above morpheme analysis into phrases so as to extract and analyze grammatical dependency (a subject and a predicate or a modifier and a modifiee, etc.) between the phrases.

The extraction unit 13 accesses the predicate DB 14b and searches for predicates of which the metadata is marked with the "state" flag. The extraction unit 13 identifies one or more words that are the same as or similar to the predicates extracted as a result of the search and holds the metadata thereof (metadata GM02).

As shown in FIG. 7B, the extraction unit 13 holds the metadata GM01 and GM02 as components of a matrix G001 indicating risk sources.

When the recognition unit 11 has read the section of "Event" from the RCM, the segmentation unit 12 analyzes the read information and extracts one or more words corresponding to the "Attacker". The extraction unit 13 accesses the involved party DB 14c and searches for predicates of which the metadata is marked with the "attacker" flag. The extraction unit 13 identifies one or more words that are the same as or similar to the predicates extracted as a result of the search and holds the metadata thereof (metadata JM01).

When the recognition unit 11 has read the section of "Event" from the RCM, the segmentation unit 12 analyzes the read information and extracts one or more words corresponding to the "Predicate". The extraction unit 13 accesses the predicate DB 14b and searches for predicates of which the metadata is marked with the "change" flag. The extraction unit 13 identifies one or more words that are the same as or similar to the predicates extracted as a result of the search and holds the metadata thereof (metadata JM02).

When the recognition unit 11 has read the section of "Event" from the RCM, the segmentation unit 12 analyzes the read information and extracts one or more words corresponding to the "Constituent Element". The extraction unit 13 searches in the constituent element DB 14a, identifies one or more words that are the same as or similar to the information extracted as a result of the search, and holds metadata JM03 corresponding to the identified information.

As shown in FIG. 7C, the extraction unit 13 holds the metadata JM01, JM02, and JM03 as components of a matrix J001 indicating events.

When the recognition unit 11 has read the section of "Consequence" from the RCM, the segmentation unit 12 analyzes the read information and extracts one or more words corresponding to the "Victim". The extraction unit 13 accesses the predicate DB 14b and searches for predicates of which the metadata is marked with the flag of an "undesirable consequence from the viewpoint of confidentiality, availability, and integrity". The extraction unit 13 identifies one or more words that are the same as or similar to the predicates extracted as a result of the search and holds the metadata thereof (metadata KM01).

When the recognition unit 11 has read the section of "Consequence" from the RCM, the segmentation unit 12 analyzes the read information and extracts one or more words corresponding to the "Predicate". The extraction unit 13 accesses the predicate DB 14b and searches for predicates of which the metadata is marked with the flag of an "undesirable consequence from the viewpoint of confidentiality, availability, and integrity". The extraction unit 13 identifies one or more words that are the same as or similar to the predicates extracted as a result of the search and holds the metadata thereof (metadata KM02).

As shown in FIG. 7D, the extraction unit 13 holds the metadata KM01 and KM02 as components of a matrix K001 indicating consequences.

A process of storing risk countermeasure information into the second storage unit 16 will be explained in detail, with reference to FIG. 8A.

The recognition unit 11 reads the section of "Subject" from the RCM. The extraction unit 13 searches in the involved party DB 14c by using the read information and identifies one or more words that are the same as or similar to the information extracted as a result of the search. The extraction unit 13 holds metadata TM01 corresponding to the identified information.

The recognition unit 11 reads the section of "Specific Action" from the RCM. The segmentation unit 12 analyzes the read information and extracts a portion corresponding to "Predicate". The extraction unit 13 searches in the predicate DB 14b and identifies one or more words that are the same as or similar to the information extracted as a result of the search. The extraction unit 13 holds metadata TM02 corresponding to the identified information.

The recognition unit 11 reads the section of "Where" from the RCM. The segmentation unit 12 analyzes the read information and extracts a portion corresponding to "Constituent Element". The extraction unit 13 searches in the constituent element DB 14a and identifies one or more words that are the same as or similar to the information extracted as a result of the search. The extraction unit 13 holds metadata TM03 corresponding to the identified information.

As shown in FIG. 8B, the extraction unit 13 holds the metadata TM01, TM02, and TM03 as components of a matrix T001 indicating countermeasures.

As shown in FIG. 9, with respect to each of the risk item numbers, the generation unit 15 concatenates together the metadata value of the constituent element, a metadata value from the matrix G001 indicating the risk sources, a metadata value from the matrix J001 indicating the events, a metadata value from the matrix K001 indicating the consequences, and a metadata value from the matrix T001 indicating the countermeasures and further stores the concatenated results therein so as to be kept in correspondence. The metadata values of the constituent elements, the metadata values from the matrix indicating the risk sources, the metadata values from the matrix indicating the events, and the metadata values from the matrix indicating the consequences correspond to the risk analysis information. The metadata values from the matrix indicating the countermeasures correspond to the risk countermeasure information.

As explained above, the assistance device 1 stores the risk analysis information and the risk countermeasure information in the second storage unit 16.

[The Second Phase: A Presentation Process at the Time of Creating the Requirement Definition Document]

Figure 10:
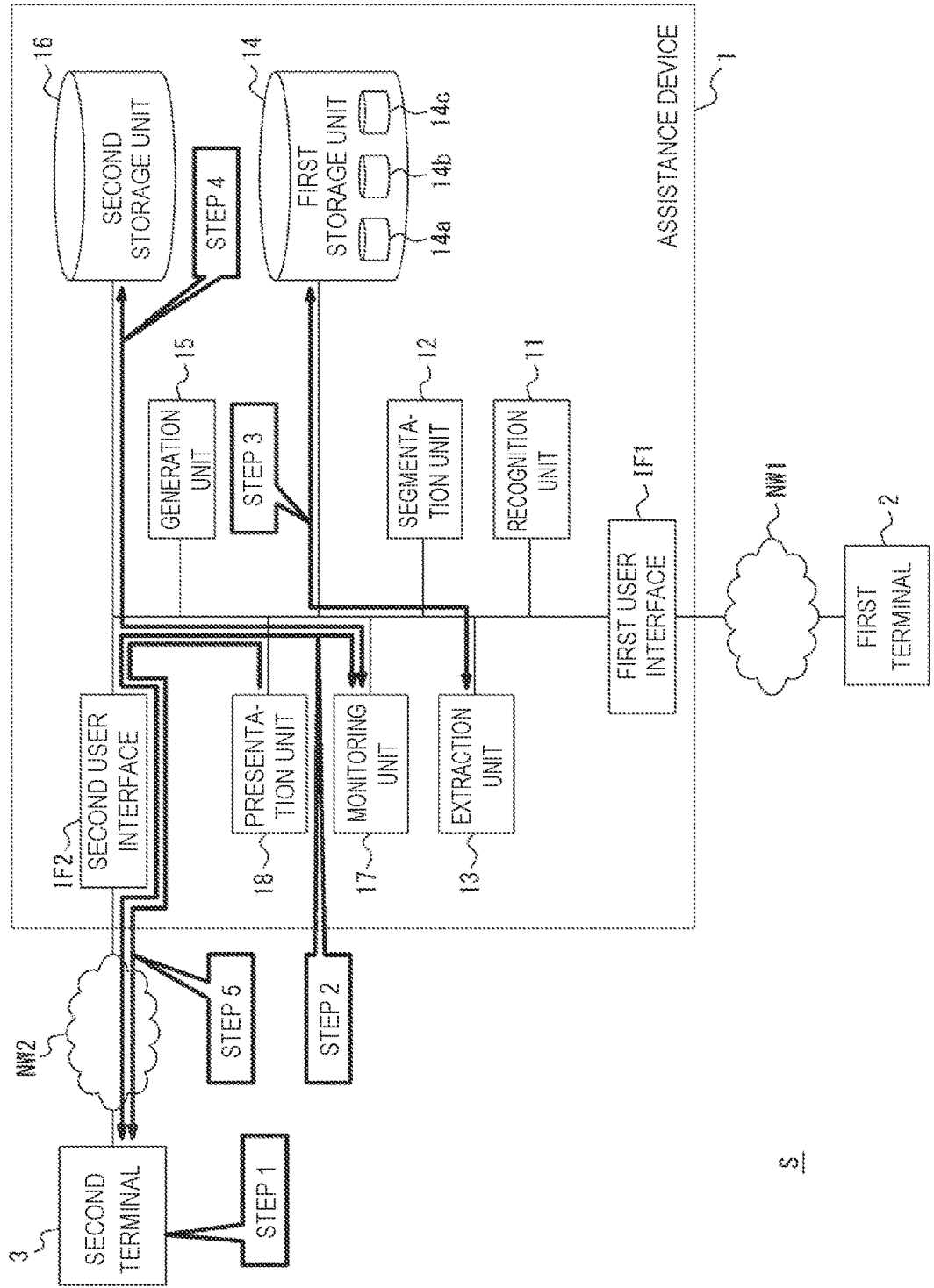
FIG. 10 is a diagram showing an outline of a first presentation process performed by the assistance system.

An outline of a presentation process performed by the assistance system S will be explained, with reference to FIG. 10. The process shown in FIG. 10 depicts an approach from "Constituent Elements" input by the requirement definition creator.

At step 1, the second terminal 3 receives an input of a character string from the requirement definition creator.

At step 2, the monitoring unit 17 of the assistance device 1 obtains an input status on a requirement definition document creation screen of the second terminal 3 and monitors the input status at predetermined intervals (from moment to moment).

At step 3, the extraction unit 13 searches in the first storage unit 14, by using input words as a key. The extraction unit 13 determines whether or not each of the words used as a key is present among the characteristic words regarding the "Involved Parties" or the "Constituent Elements" stored in the first storage unit 14.

At step 4, the extraction unit 13 searches in the second storage unit 16, by using the characteristic word determined as being present, as a key. The extraction unit 13 extracts, from the second storage unit 16, a risk source, an event, a consequence, and a countermeasure related to the characteristic word used as the key.

At step 5, the presentation unit 18 causes the display unit of the second terminal 3 to display the countermeasure information extracted from the second storage unit 16.

The presentation process shown in FIG. 10 will be explained in detail, with reference to FIG. 11 and FIG. 12.

Figure 11:
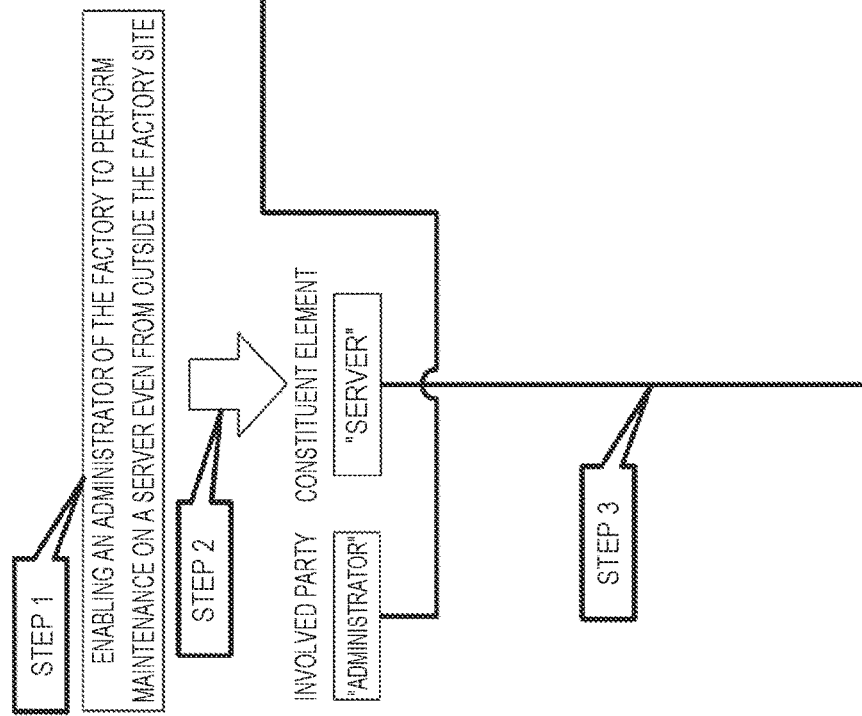
FIG. 11 is a drawing showing the first half of the first presentation process.

At step 1 in FIG. 11, the second terminal 3 receives an input of a character string from the requirement definition creator. As one example, let us discuss a situation in which the character string is "Enabling an administrator of the factory to perform maintenance on a server even from outside the factory site".

At step 2, the monitoring unit 17 of the assistance device 1 obtains an input status on the requirement definition document creation screen of the second terminal 3. The segmentation unit 12 extracts words from the character string being input. More specifically, the segmentation unit 12 extracts "administrator" corresponding to an involved party and "server" corresponding to a constituent element.

At step 3, the extraction unit 13 searches in the first storage unit 14 by using the words extracted by the segmentation unit 12 as a key. The extraction unit 13 determines whether or not each of the words used as a key is present among the characteristic words stored in the first storage unit 14. More specifically, the extraction unit 13 determines whether or not "administrator" corresponding to an involved party is present in the involved party DB 14c. The extraction unit 13 determines whether or not "server" corresponding to a constituent element is present in the constituent element DB 14a. As shown in FIG. 11, the extraction unit 13 determines that "administrator" and "server" are present in the involved party DB 14c and the constituent element DB 14a, respectively.

Figure 12:
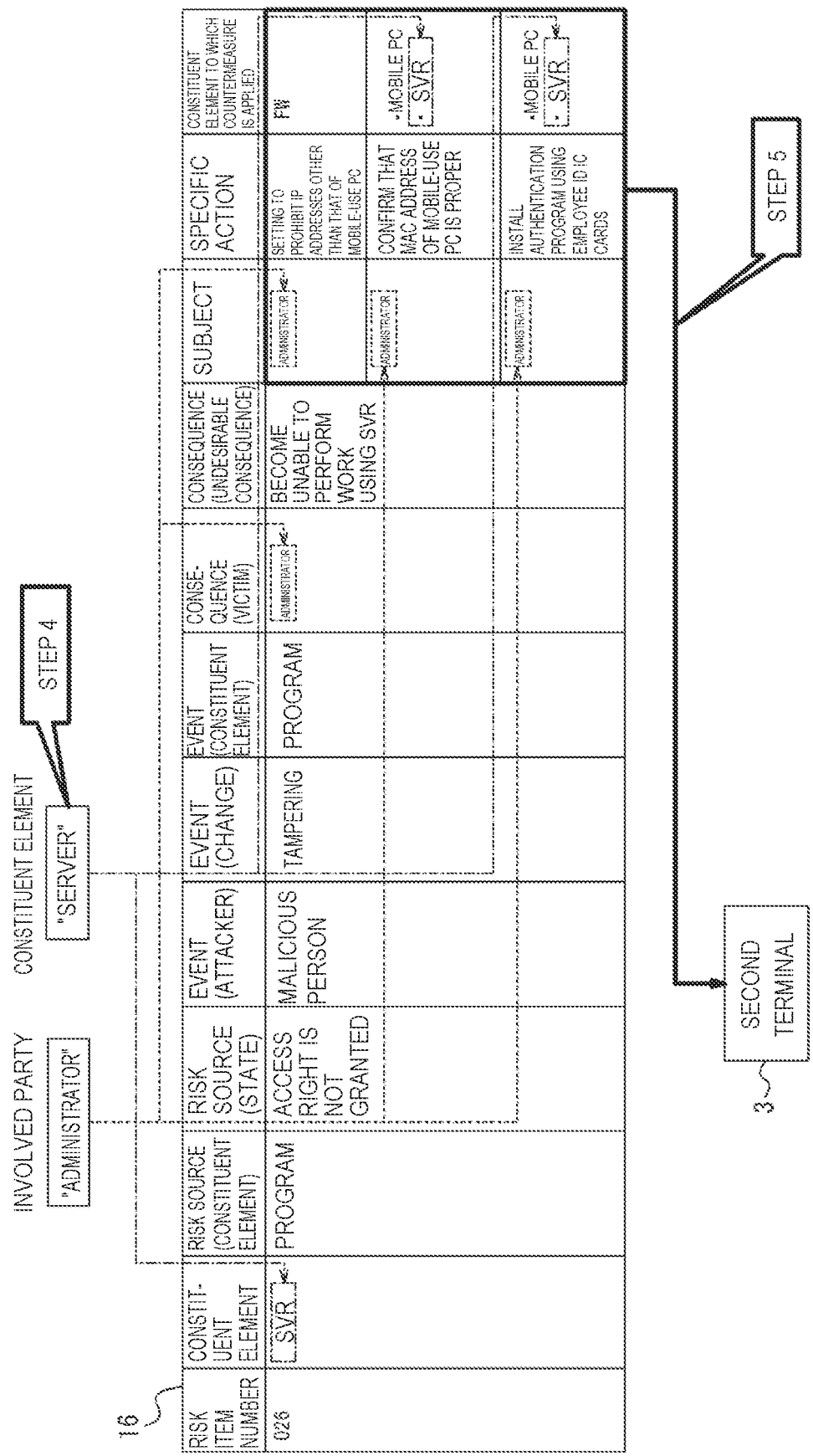
FIG. 12 is a drawing showing the second half of the first presentation process.

As shown in FIG. 12, at step 4, the extraction unit 13 searches in the second storage unit 16, by using "administrator" and "server" as a key. Although the English character strings (originally "Japanese character strings" before translated) are written in the sections of FIG. 12 for the sake of convenience in the explanation, metadata is written in the second storage unit 16 in actuality.

In place of "server", the extraction unit 13 may search in the second storage unit 16 by using "SVR", which is a word similar to "server", as a key. As shown in FIG. 12, the extraction unit 13 extracts, from the second storage unit 16, the risk item number 026 in which "administrator" or "server" (or "SVR") is written in at least one section.

At step 5, the presentation unit 18 causes the display unit of the second terminal 3 used by the requirement definition creator to display the risk countermeasure information (i.e., the subject, the specific action, and the constituent element to which the countermeasure is applied) in the extracted risk item number 026. For example, the display unit displays the information presented below, so as to prompt the risk countermeasure to be adopted.

[An Example of the Displayed Information]

Chapter 2: Maintenance Work on Servers

The administrator should configure settings of the FW so as to prohibit IP addresses other than that of the mobile-use PC.

The administrator should install a function that confirms that the MAC address of the maintenance mobile PC is proper.

The administrator should install in the maintenance mobile PC an authentication program using employee ID IC cards.

Figure 13:
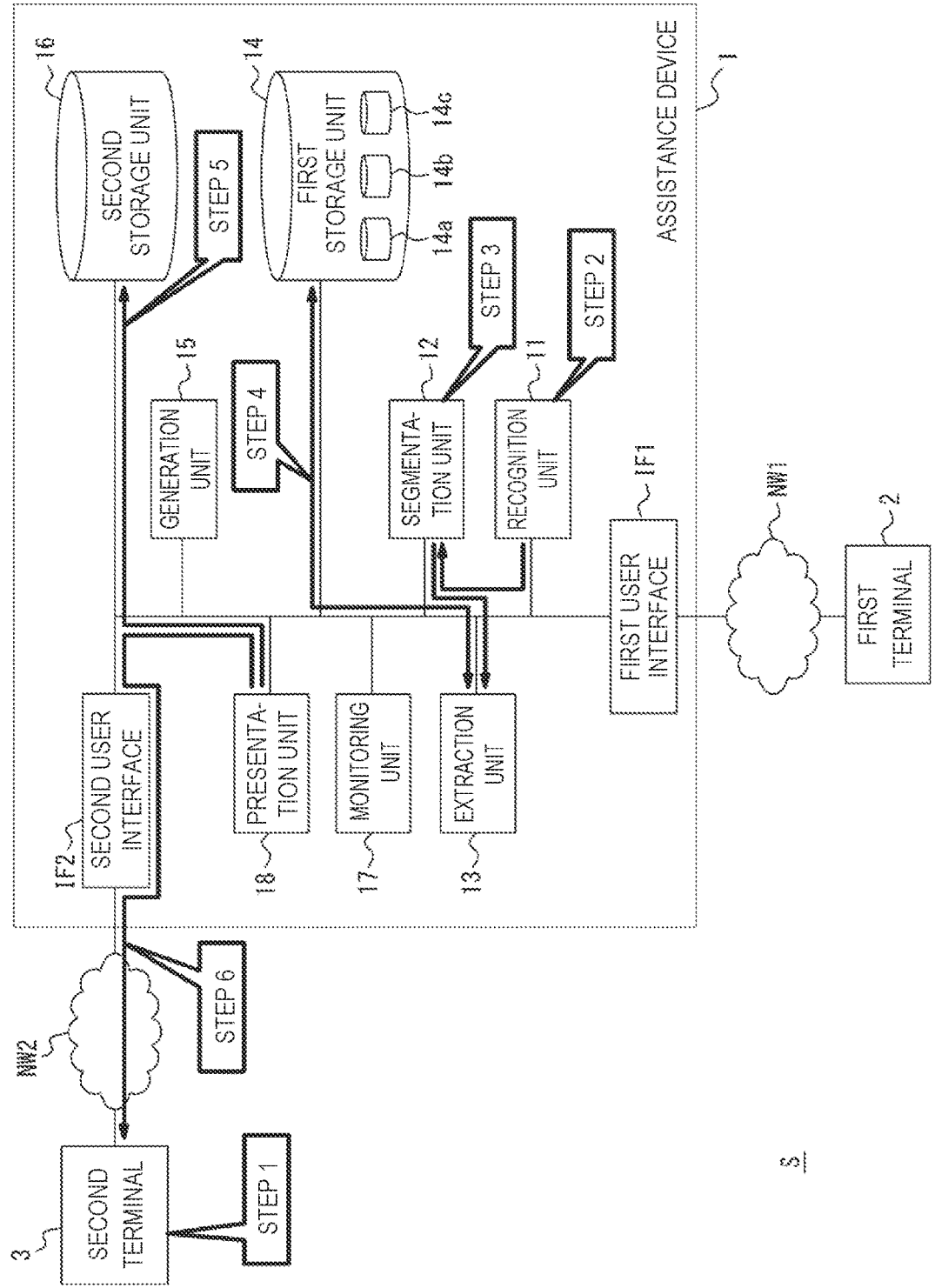
FIG. 13 is a diagram showing an outline of a second presentation process performed by the assistance system.

With reference to FIG. 13, an outline of another presentation process performed by the assistance system S will be explained. The process shown in FIG. 13 depicts an approach from an "undesirable occurrence" input by the requirement definition creator.

At step 1, the second terminal 3 receives an input of a character string from the requirement definition creator.

At step 2, the recognition unit 11 of the assistance device 1 reads the character string (a sentence in the present example) of the "undesirable occurrence" input by the requirement definition creator.

At step 3, the segmentation unit 12 structures the character string of the "undesirable occurrence" into an involved party, a constituent element, and a predicate.

At step 4, the extraction unit 13 searches in the first storage unit 14 by using the structured words as a key. The extraction unit 13 determines whether or not each of the words used as the key is present among the characteristic words regarding "Events" and "Consequences" stored in the first storage unit 14.

At step 5, upon determining that one or more of the words used as the key are present among the characteristic words, the extraction unit 13 searches in the second storage unit 16 by using the characteristic words as a key. The extraction unit 13 extracts the risk source, the event, the consequence, and the countermeasure that are kept in correspondence with the constituent element found in the search.

At step 6, the presentation unit 18 causes the second terminal 3 used by the requirement definition creator to display the risk countermeasure information extracted from the second storage unit 16.

The presentation process shown in FIG. 13 will be explained in detail, with reference to FIG. 14 and FIG. 15.

Figure 14:
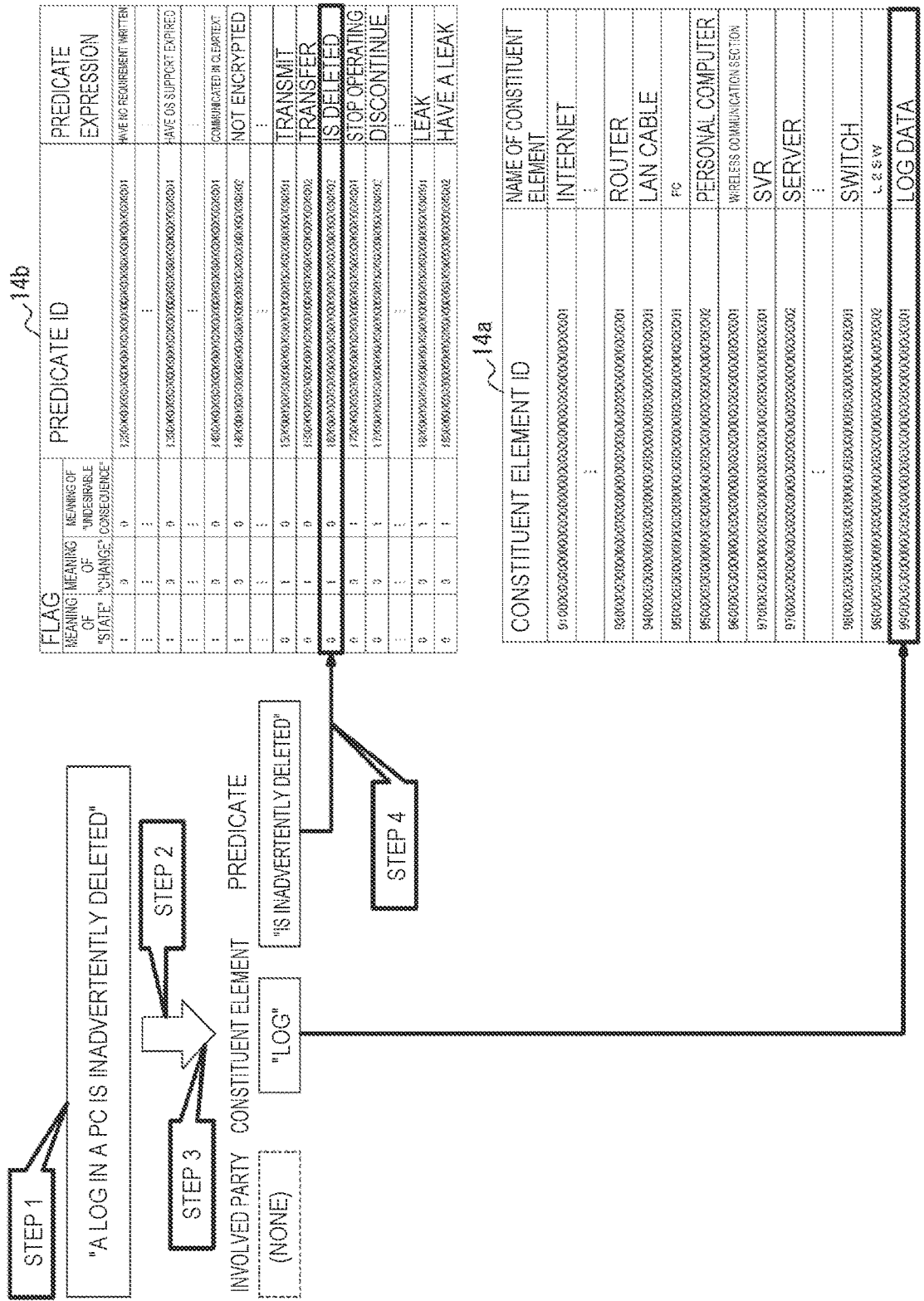
FIG. 14 is a drawing showing the first half of the second presentation process.

At step 1 in FIG. 14, the second terminal 3 receives an input of a character string from the requirement definition creator. As an example, let us discuss a situation where the character string is "A log in a PC is inadvertently deleted".

At step 2, the recognition unit 11 of the assistance device 1 reads the character string of the "undesirable occurrence" input by the requirement definition creator.

At step 3, the segmentation unit 12 structures the read character string into an involved party, a constituent element, and a predicate. When the character string is "A log in a PC is inadvertently deleted", there is no word that corresponds to the involved party. The words corresponding to the constituent element and the predicate are "log" and "is inadvertently deleted", respectively.

At step 4, the extraction unit 13 searches in the first storage unit 14 by using the structured words as a key. With respect to each of the words used as the key, the extraction unit 13 determines whether or not a characteristic word marked with the flag "change" or "undesirable consequence" is present among the characteristic words stored in the first storage unit 14. As shown in FIG. 14, the extraction unit 13 extracts "is deleted" from the predicate DB 14b, also extracts "log" (a portion of "log data" in the constituent element DB 14a) from the constituent element DB 14a, and thus determines that there are characteristic words satisfying the condition.

Figure 15:
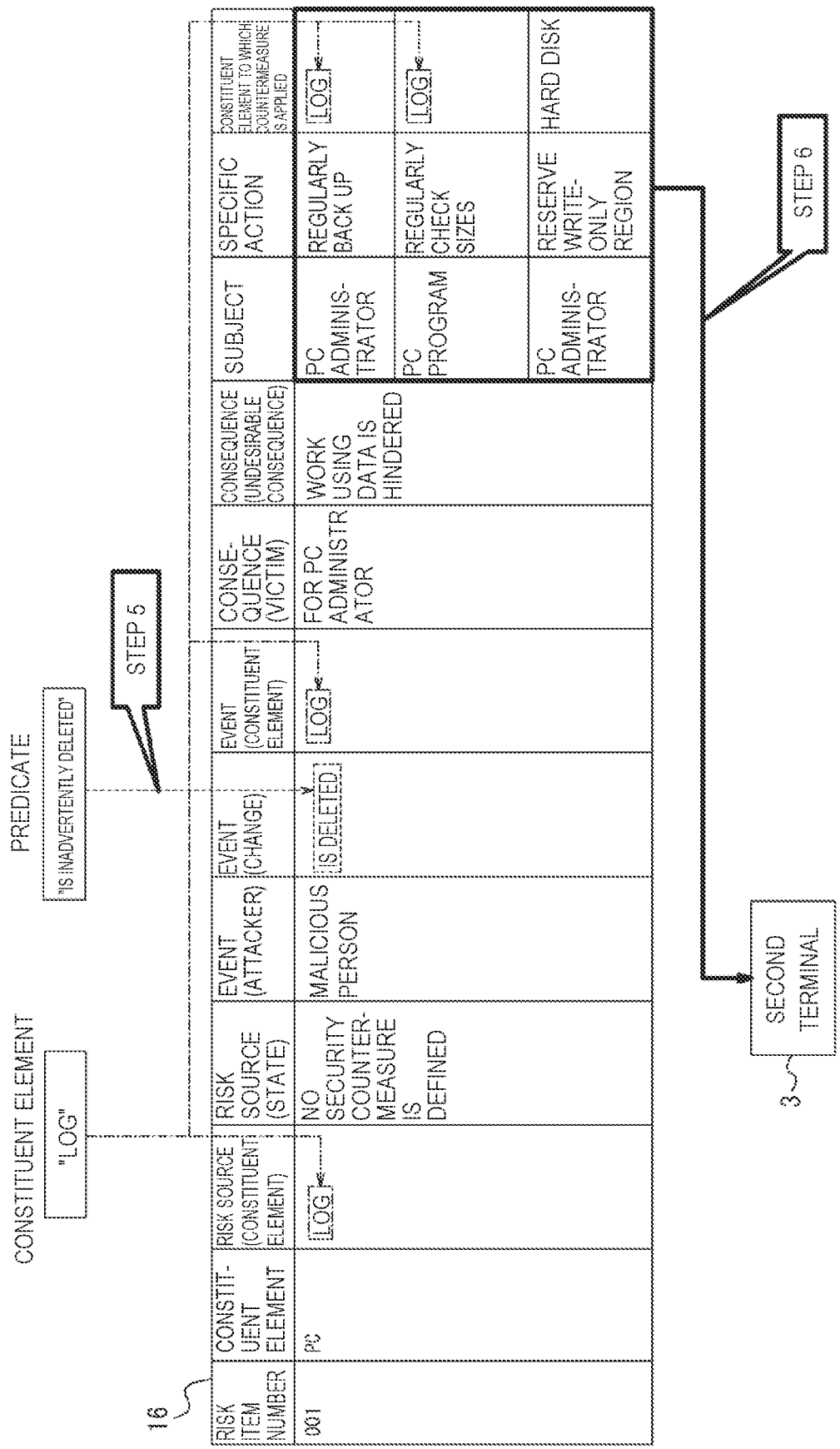
FIG. 15 is a drawing showing the second half of the second presentation process.

As shown in FIG. 15, at step 5, the extraction unit 13 searches in the second storage unit 16 by using the determined characteristic words as a key. Although the English character strings (originally "Japanese character strings" before translated) are written in the sections of FIG. 15 for the sake of convenience in the explanation, metadata is written in the second storage unit 16 in actuality. In the present embodiment, as shown in FIG. 15, the extraction unit 13 determines that the characteristic word "log" is present in the sections of "Risk Source", "Event", and "Constituent Element to which Countermeasure is Applied" in the second storage unit 16. The extraction unit 13 extracts, from the second storage unit 16, the risk source, the event, the consequence, and the risk countermeasure information (i.e., the subject, the specific action, and the constituent element to which the countermeasure is applied) that are kept in correspondence with the risk item number 001 determined to contain the characteristic word "log".

At step 6, the presentation unit 18 causes the display unit of the second terminal 3 used by the requirement definition creator to display the risk countermeasure information kept in correspondence with the risk item number 001 extracted from the second storage unit 16. For example, the display unit displays the information presented below:

[An Example of the Displayed Information]
Chapter 2: PCs
   The administrator of the PCs should regularly back up the logs.
   A program in the PCs should regularly check the log sizes.
   The administrator of the PCs should reserve a write-only region in the hard disks.

As explained above, the assistance device 1 presents the risk countermeasure information.

Figure 16:
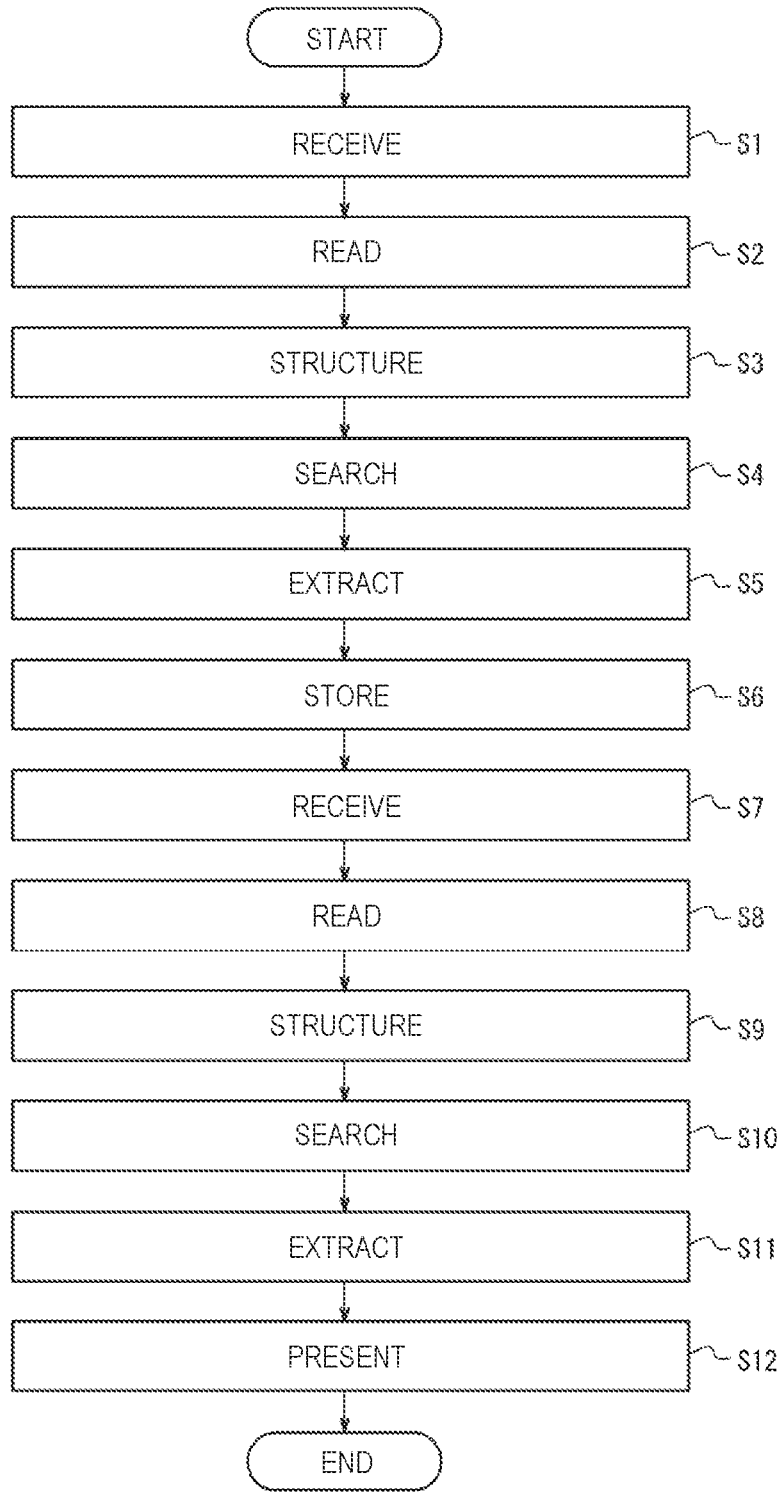
FIG. 16 is a drawing showing a flowchart of a process performed by the assistance system of the present embodiments.

FIG. 16 is a flowchart of an example of a process performed by the assistance system S.

The processes from steps S1 to S6 correspond to the first phase described above.

At step S1, the first terminal 2 receives an input from the operator.

At step S2, the recognition unit 11 of the assistance device 1 reads the character strings from the RCM.

At step S3, the segmentation unit 12 structures the character strings written in the RCM.

At step S4, the extraction unit 13 determines whether or not each of the structured words is present among the characteristic words in the first storage unit 14.

At step S5, the extraction unit 13 extracts the metadata corresponding to the characteristic words determined to be present in the first storage unit 14.

At step S6, the extraction unit 13 stores the pieces of metadata of the characteristic words into the second storage unit 16 so as to be kept in correspondence.

The processes from steps S7 to S12 correspond to the second phase described above.

At step S7, the second terminal 3 receives an input from the requirement definition creator.

At step S8, the recognition unit 11 reads the input character string.

At step S9, the segmentation unit 12 structures the read character string. When the character string read at step S9 has already been structured into single words or the like, the process at step S9 does not need to be performed.

At step S10, the extraction unit 13 searches in the first storage unit 14 by using the structured words as a key. The extraction unit 13 determines whether or not each of the words used as the key is present among the characteristic words in the first storage unit 14.

At step S11, the extraction unit 13 searches in the second storage unit 16, by using the characteristic words determined to be present, as a key. The extraction unit 13 extracts the information corresponding to the risk item number extracted as a result of the search.

At step S12, the presentation unit 18 causes the display unit of the second terminal 3 to display the risk countermeasure information among the extracted information.

As explained above, the extraction unit 13 in the assistance device 1 of the present embodiments extracts the words from the character string being input, searches in the first storage unit 14 for the characteristic words that are the same as or similar to the extracted words, and extracts the risk countermeasure information corresponding to the characteristic words from the second storage unit 16. The presentation unit 18 presents the extracted risk countermeasure information. With this configuration, the assistance device 1 is, for example, able to eliminate overlooking the risks in the situation where the "constituent element subject to a risk analysis" is different from the "constituent element to which a relevant risk countermeasure is applied". Accordingly, the assistance device 1 is able to assist the creation of the requirement definition document while minimizing potentially missing security requirements. Furthermore, for example, when the operator simply writes an "undesirable occurrence" on the words level, the assistance device 1 presents a constituent element, an anticipated risk, and a risk countermeasure. With this configuration, the assistance device 1 is able to significantly shorten the time required by the risk assessment work and is also able to realize efficiency enhancement of the work to create the requirement definition document. As explained herein, the assistance device 1 is able to enhance the risk analysis and the risk countermeasure proposal using the risk control matrix.

Further, in the assistance device 1 of the present embodiments, the constituent element DB 14a structures the words expressing the constituent elements of the risks by using the metadata and stores therein the result. The predicate DB 14b structures the words expressing the undesirable states from the viewpoint of information security, the words expressing changes of the constituent elements, and the words expressing the undesirable consequences from the viewpoint of information security, by using the metadata and stores therein the result. The involved party DB 14c structures the words each expressing a person or an organization involved in the prescribed information system by using the metadata indicating that the involved person or organization is at least one of an attacker and a victim and stores therein the result. By using this configuration, the assistance device 1 is able to present the risk countermeasure information that is highly relevant to the input character string, with a relatively high precision level.

Further, when searching for the characteristic words similar to the words, the assistance device 1 of the present embodiments searches for a characteristic word corresponding to the metadata having the shortest Hamming distance to the metadata corresponding to each of the words. By using this configuration, the assistance device 1 is able to shorten the search time for the similar words.

Further, the extraction unit 13 in the assistance device 1 of the present embodiments searches in the corresponding sections of the first storage unit 14, by using each of the plurality of pieces of information read from the risk control matrix (RCM). The extraction unit 13 further extracts the plurality of pieces of metadata corresponding to the characteristic words each of which is the same as or similar to a different one of the plurality of pieces of information and stores the extracted plurality of pieces of metadata into the second storage unit 16 so as to be kept in correspondence. By using this configuration, the extraction unit 13 is able to structure the second storage unit 16 and to thus enhance efficiency of the searches.

It is also possible to realize an assistance device D of the present embodiments by using an arbitrary computer and a program. More specifically, the program describing the content of the processes to realize the functions of the assistance device 1 are recorded in a recording medium such as a memory, so that a processor is caused to read and execute the program. The program may be provided via a network.

The program may be recorded on a computer-readable medium. Using a computer-readable medium makes it possible to install the program in a computer. In this situation, the computer-readable medium that has recorded the program thereon may be a non-transitory recording medium. Although not particularly limited, the non-transitory recording medium may be a recording medium such as a CD-ROM or a DVD-ROM, for example.

Although the present invention is described on the basis of the various drawings and embodiment examples, it should be mentioned that a person skilled in the art is able to easily make various modifications and revisions on the basis of the present disclosure. Accordingly, it should be noted that these modifications and revisions are included in the scope of the present invention. For example, the functional units, the functions included in the steps, and the like may be re-arranged as long as no logical conflict occurs. It is also acceptable to combine two or more functional units or steps into one and to divide any of the functional units or steps.

REFERENCE SIGNS LIST

S Assistance System
1 Assistance Device
IF1 First User Interface
IF2 Second User Interface
11 Recognition Unit
12 Segmentation Unit
13 Extraction Unit
14 First Storage Unit
14a Constituent Element DB
14b Predicate DB
14c Involved Party DB
15 Generation Unit
16 Second Storage Unit
17 Monitoring Unit
18 Presentation Unit
2 First Terminal
3 Second Terminal
NW1 First Network
NW2 Second Network

The invention claimed is:

1. An assistance device comprising:
a first memory configured to store characteristic words related to risks;
a second memory configured to store pieces of risk countermeasure information related to risk countermeasures;
a processor configured to
extract a word from an input character string, searches in the first memory for a characteristic word that is same as or similar to the word,
extract one of the pieces of risk countermeasure information corresponding to the characteristic word from the second memory, and
cause presentation of the extracted piece of risk countermeasure information,
wherein the first memory includes a constituent element database (DB), a predicate DB, and an involved party DB, the constituent element DB structures words expressing constituent elements of the risks by using metadata and stores therein a result thereof, the predicate DB structures words each expressing an undesirable state from a viewpoint of information security, words each expressing a change in a constituent element, and words each expressing an undesirable consequence from a viewpoint of information security, by using metadata and stores therein a result thereof, the involved party DB structures words each expressing a person or an organization involved in a prescribed information system by using metadata indicating that the involved person or organization is at least one of an attacker and a victim and stores therein a result thereof, the constituent element DB includes a constituent element identifier (ID) for each constituent element stored therein, the constituent element ID being a 50-digit number, and the predicate DB includes at least a predicate element ID for every element stored therein, and a plurality of flags for every element stored therein to indicate a state of a corresponding element stored in the predicate DB.

2. The assistance device according to claim 1, wherein the first memory stores therein metadata corresponding to a plurality of similar words while keeping a Hamming distance of the metadata minimized, and searching for the characteristic word similar to the word includes searching for the characteristic word corresponding to metadata having a shortest Hamming distance to metadata corresponding to the word.

3. The assistance device according to claim 1, wherein the processor searches in a corresponding section of the first memory by using each of a plurality of pieces of information read from a Risk Control Matrix (RCM), extracts a plurality of pieces of metadata corresponding to characteristic words that are same as or similar to the plurality of pieces of information, respectively, and stores the extracted plurality of pieces of metadata into the second storage unit so as to be kept in correspondence.

4. The assistance device according to claim 3, wherein the plurality of pieces of information are read from sections of constituent elements, risk sources, events, consequences, and countermeasures in the RCM.

5. An assistance method comprising:
storing, in a first memory, characteristic words related to risks;
storing, in the second memory, pieces of risk countermeasure information related to risk countermeasures;
extracting, by a processor, a word from an input character string, to search in the first memory for a characteristic word that is same as or similar to the word, and extracting one of the pieces of risk countermeasure information corresponding to the characteristic word from the second memory; and
causing, by the processor, presentation of the extracted piece of risk countermeasure information,
wherein the first memory includes a constituent element database (DB), a predicate DB, and an involved party DB, the constituent element DB structures words expressing constituent elements of the risks by using metadata and stores therein a result thereof, the predicate DB structures words each expressing an undesirable state from a viewpoint of information security, words each expressing a change in a constituent element, and words each expressing an undesirable consequence from a viewpoint of information security, by using metadata and stores therein a result thereof,
the involved party DB structures words each expressing a person or an organization involved in a prescribed information system by using metadata indicating that the involved person or organization is at least one of an attacker and a victim and stores therein a result thereof,
the constituent element DB includes a constituent element identifier (ID) for each constituent element stored therein, the constituent element ID being a 50-digit number, and
the predicate DB includes at least a predicate element ID for every element stored therein, and a plurality of flags for every element stored therein to indicate a state of a corresponding element stored in the predicate DB.

6. A non-transitory computer-readable medium storing a program that, when executed by a computer causes the computer to function as the assistance device according to claim 1.

7. An assistance system including an assistance device, a first terminal communicably connected to the assistance device, and a second terminal communicably connected to the assistance device, the assistance device comprising:
a first memory configured to store characteristic words related to risks;
a second memory configured to store pieces of risk countermeasure information related to risk countermeasures; and
a processor configured to
extract a word from a character string input to the first terminal, search in the first memory for a characteristic word that is same as or similar to the word, and extract one of the pieces of risk countermeasure information corresponding to the characteristic word from the second memory, and
cause presentation of the extracted piece of risk countermeasure information on the second terminal,
wherein the first memory includes a constituent element database (DB), a predicate DB, and an involved party DB, the constituent element DB structures words expressing constituent elements of the risks by using metadata and stores therein a result thereof, the predicate DB structures words each expressing an undesirable state from a viewpoint of information security, words each expressing a change in a constituent element, and words each expressing an undesirable consequence from a viewpoint of information security, by using metadata and stores therein a result thereof,
the involved party DB structures words each expressing a person or an organization involved in a prescribed information system by using metadata indicating that the involved person or organization is at least one of an attacker and a victim and stores therein a result thereof,
the constituent element DB includes a constituent element identifier (ID) for each constituent element stored therein, the constituent element ID being a 50-digit number, and
the predicate DB includes at least a predicate element ID for every element stored therein, and a plurality of flags for every element stored therein to indicate a state of a corresponding element stored in the predicate DB.

8. The assistance device according to claim 1, wherein the plurality of flags include a flag indicating an undesirable state.

9. The assistance device according to claim 8, wherein the plurality of flags include a flag indicating a change in state.

10. The assistance device according to claim 9, wherein the plurality of flags include a flag indicating an undesirable consequence.

11. The assistance device according to claim 10, wherein the predicate element ID is a 50-digit number.

12. The assistance device according to claim 11, wherein the processor is further configured to segment the character string into morphemes and to attached a grammatical function thereto.

13. The assistance device according to claim 12, wherein the processor is further configured to group the morphemes into phrases in order to extract grammatical dependencies among the morphemes.

14. The assistance device according to claim 13, wherein the risk countermeasure information includes information to cause a source of a risk to be blocked from performing predetermined commands on a computing device.

15. The assistance device according to claim 14, wherein the predetermined commands include a delete command.

16. The assistance device according to claim 15, wherein the source of the risk is blocked in a case that the source of the risk is remote from the computing device.

* * * * *